United States Patent
Sobhani et al.

(10) Patent No.: US 9,602,580 B2
(45) Date of Patent: Mar. 21, 2017

(54) SPACE-BASED ELECTRONIC DATA STORAGE AND TRANSFER NETWORK SYSTEM

(71) Applicants: Shahraum Scott Sobhani, San Diego, CA (US); Hooshang Kaen, San Diego, CA (US)

(72) Inventors: Shahraum Scott Sobhani, San Diego, CA (US); Hooshang Kaen, San Diego, CA (US)

(73) Assignee: CLOUD CONTELLATION CORPORATION, San Diego, CA (US)

( * ) Notice: Subject to any disclaimer, the term of this patent is extended or adjusted under 35 U.S.C. 154(b) by 0 days.

(21) Appl. No.: 15/225,826

(22) Filed: Aug. 2, 2016

(65) Prior Publication Data

US 2017/0034250 A1   Feb. 2, 2017

Related U.S. Application Data

(63) Continuation of application No. PCT/US2016/016467, filed on Feb. 3, 2016.
(Continued)

(51) Int. Cl.
*G06F 15/16* (2006.01)
*H04L 29/08* (2006.01)
(Continued)

(52) U.S. Cl.
CPC ......... *H04L 67/06* (2013.01); *H04B 7/18521* (2013.01); *H04B 10/29* (2013.01); *H04L 67/1097* (2013.01)

(58) Field of Classification Search
USPC ....... 709/203, 217, 219, 223, 224, 226, 228, 709/232, 238; 370/321
See application file for complete search history.

(56) References Cited

U.S. PATENT DOCUMENTS 5,722,042 A   2/1998   Kimura
6,002,916 A   12/1999   Lynch
(Continued)

OTHER PUBLICATIONS

Mark Brown, "The Pirate Bay plans low-orbit server drones to escape legal jurisdiction", WIRED online, website captured Jun. 21, 2016, original URL unknown.
(Continued)

*Primary Examiner* — Quang N Nguyen
(74) *Attorney, Agent, or Firm* — Manatt, Phelps & Phillips, LLP

(57) ABSTRACT

A space-based electronic data storage and transfer network system is disclosed. The network system includes terrestrial access points, a plurality of geostationary communications satellites, and a plurality of communicatively coupled low-earth orbit data storage satellites. The terrestrial access point establishes a link or communication with a geostationary communications satellite which relays the link or communication to a low-earth orbit data storage satellite for storing information contained within the link or communication. The terrestrial access point can also establish a link or communication with a geostationary communications satellite which relays the link or communication to a low-earth orbit data storage satellite requesting retrieval of information stored within the link or communication. Any low-earth orbit data storage satellite can access data from any other low-earth orbit data storage satellite through the communicative coupling. The network disclosed can be quickly and securely accessed from anywhere on earth.

14 Claims, 8 Drawing Sheets

Related U.S. Application Data

(60) Provisional application No. 62/111,600, filed on Feb. 3, 2015.

(51) Int. Cl.
  *H04B 10/29* (2013.01)
  *H04B 7/185* (2006.01)

(56) References Cited

U.S. PATENT DOCUMENTS

| | | | |
|---|---|---|---|
| 6,078,810 | A | 6/2000 | Olds et al. |
| 6,226,493 | B1 | 5/2001 | Leopold et al. |
| 7,283,491 | B2 * | 10/2007 | Ichiyoshi ........... H04B 7/18582 370/321 |
| 7,369,809 | B1 | 5/2008 | Wang |
| 9,189,451 | B1 * | 11/2015 | Freedman ................ B64G 1/68 |
| 9,369,883 | B2 * | 6/2016 | Giffin ................ H04B 7/18578 |
| 9,391,702 | B2 | 7/2016 | Wyler |
| 2001/0013566 | A1 | 8/2001 | Yung |
| 2009/0234585 | A1 * | 9/2009 | Ross ........................ G01V 1/22 709/219 |
| 2011/0169688 | A1 | 7/2011 | Wyler |
| 2014/0341586 | A1 | 11/2014 | Wyler |

OTHER PUBLICATIONS

International Search Report, Jun. 20, 2016, 16 pages.

\* cited by examiner

SPACE-BASED ELECTRONIC DATA STORAGE AND TRANSFER NETWORK SYSTEM

INCORPORATION BY REFERENCE TO RELATED APPLICATIONS

This patent application claims the benefit of priority to and is a continuation of International Application No. PCT/US16/16467 titled "SPACE-BASED ELECTRONIC DATA STORAGE AND TRANSFER NETWORK SYSTEM" and filed Feb. 3, 2016, which claims the benefit of priority to and is a continuation of U.S. Provisional Application No. 62/111,600, titled "SkyCloud Autonomous Electronic Data Storage and Information Delivery Network System" and filed Feb. 3, 2015, both of which are incorporated herein by reference in their entirety.

BACKGROUND

Field of the Invention

This patent document relates generally to networks for datastorage and transfer. This application relates more particularly to cloud storage networks remotely hosting data in orbital satellites and transferring data through a network of orbital satellites and their use.

Description of the Related Art

Over the years, computers have improved in size, speed, and performance, and the amount of data that a user creates, accesses and stores has grown exponentially. Traditional backup solutions periodically copy data to local storage media such as a tape back-up, but, such solutions do not possess remote accessibility and may be vulnerable to device failure. With the creation of high speed internet access and mobile computing, the demand to remotely store and back up data has rapidly increased. Users (including organizations) are increasingly storing their data and even applications on remote data servers, and accessing their data and applications remotely. Remote data storage providers must store data reliably for extended periods of time, and many users want access to their data quickly and from any location. Additionally, in some cloud computing embodiments, many users or many terminals must access the data simultaneously from multiple points around the planet or network.

Cloud computing is a network system in which computing resources such as application programs and file storage are remotely hosted and accessed over the Internet or some other network. Today's cloud storage networks use wired and wireless connections to transfer and store electronic data to and retrieve electronic data from data centers located around the world. The majority of network access originates in urban areas where land and power are expensive, while most data centers are located in rural areas where land and power are cheap, introducing an additional delay and risk as the data travels thousands of kilometers of wire through numerous junctions and access points. The owners of wired and wireless networks charge fees for access, throttle users and services, and expose data to additional security risks. Additionally a user must be within the coverage area of a wired or wireless network to enable use of today's cloud storage networks, making access in remote or unfamiliar locations difficult, restricted, or impossible.

Terrestrial data centers require infrastructure including structures, a reliable power source, reliable high-speed communications accessibility, cooling, and physical security. Data center locations may expose users to unwanted jurisdictions or security risks, and governmental restrictions on geographical data storage location present a complicated set of rules for data access. Physical intrusion or local disaster at a data center can result in lost data, unauthorized access, and/or service interruption. A cloud storage network connected to the internet presents additional risks, as the network is inherently accessible through multiple servers and third party networks, subjecting electronic data stored therein to potential unauthorized access, hacking attempts, and electronic security breach.

The inventors here have recognized that there are definite drawbacks to modern remote data storage networks, reliance on established network systems, and connection to the internet. Accordingly, it is here recognized that a continued need exists to overcome and improve upon such shortcomings in such conventional data storage and network systems.

SUMMARY

Therefore there exists a continuing need for a new and improved remote data storage network that can be quickly, reliably, and securely accessed from anywhere in the world.

Various aspects are described in connection with an illustrative implementation of a space-based electronic data storage and transfer network system ("satellite cloud network") disclosed herein. The various aspects are disclosed in the written specification including the drawings, and claims, and may be combined to form claims for a device, apparatus, system method of manufacture and/or use in any way, consistent with the teachings herein, without limitation.

The satellite cloud network comprises uniquely configured and constructed access terminal, communications satellite, and network satellite components. The access terminals are positioned on the Earth and configured to communicate with communications satellites orbiting in a fixed geostationary ("GEO") orbit (or any other orbit) relative to the access terminal. The communications satellites are configured to receive the communications from the access terminal and route those communications to one or more network satellites and to receive communications from one or more of the network satellites and route those communications to the access terminals. A number of network satellites are positioned in low-earth orbit ("LEO") around the earth and configured to maintain constant communication between the network satellites. The network satellites are configured to orbit the earth in a and communicate with communications satellites. The system is configured so that a communication from an access terminal is routed by the communications satellite to a network satellite, and that network satellite is capable of retrieving information from any other network satellite to provide a reaction or response to the communication received indirectly from the access terminal.

In one aspect, the network satellites include data storage elements and may be used to store, distribute, or back up information as an orbital modular data center or orbital "cloud storage network, with portions of the total data stored on separate storage satellites. In another aspect, not all network satellites include data storage, as some communicate within the network but provide alternate utility for the system. In a further aspect, not all network satellites are capable of communicating with the communication satellites, with some network satellites only capable of communicating with other network satellites while providing some alternate utility for the system.

In one aspect, the system relies on existing communications satellites for intermediate communication routing. In another aspect, the system instead incorporates dedicated communications satellites and proprietary communications protocols between the access terminals, the communication satellites, and the network satellites.

In one aspect, the network satellites occupy a single orbital plane. In another aspect, the network satellites occupy multiple separate orbital planes. In a further aspect, the network satellites may orbit at a single orbital altitude or velocity. In another aspect, the network satellites may orbit at different altitudes or velocities.

Various alternative implementations of the foregoing aspects are disclosed. The foregoing various aspects may be combined in any manner without limitation.

DETAILED DESCRIPTION OF THE EMBODIMENTS

Figure 1:
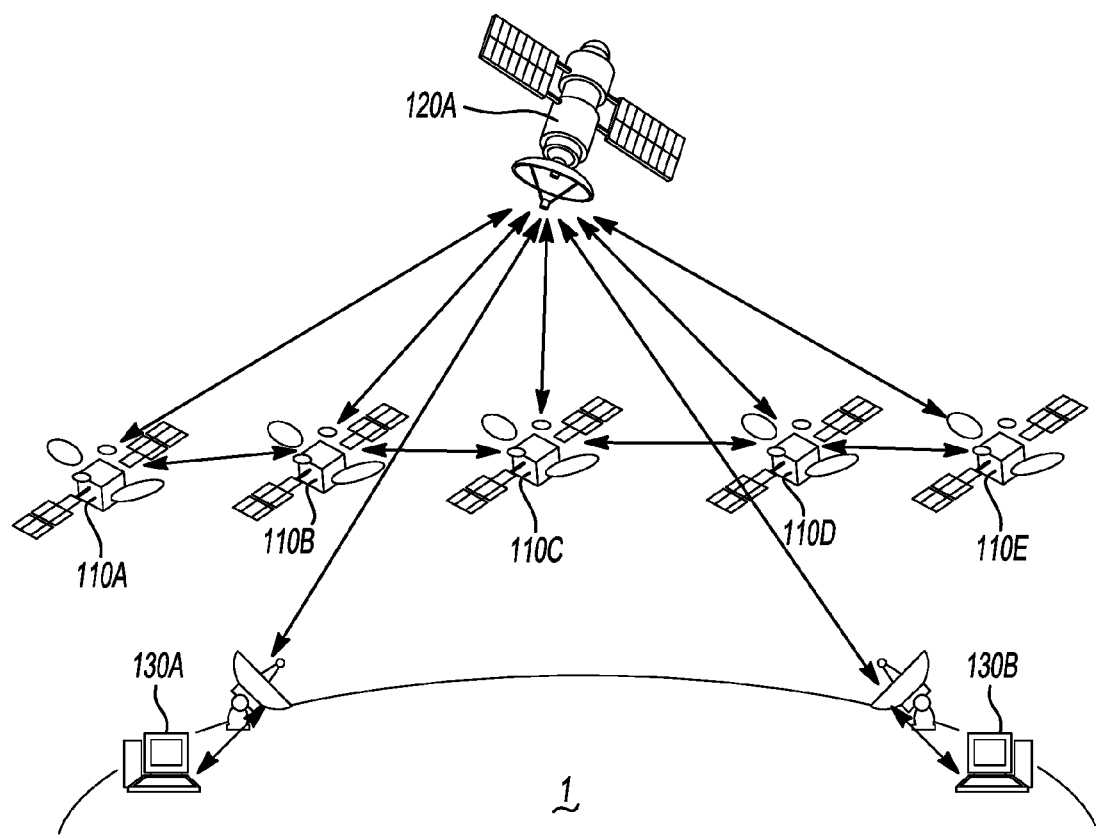
FIG. 1 is a representation of a first embodiment of the satellite cloud network with all storage satellites occupying a single orbital plane.

The features, aspects and advantages are described below with reference to the drawings, which are intended to illustrate but not to limit the invention. In the drawings, like reference characters denote corresponding features consistently throughout the drawings. FIGS. 1-8 illustrate various aspects of an embodiment of the satellite cloud network. It should be understood, however, that the teachings herein are not limited to any particular satellite purpose and are applicable to satellites used for other purposes.

Figure 2:
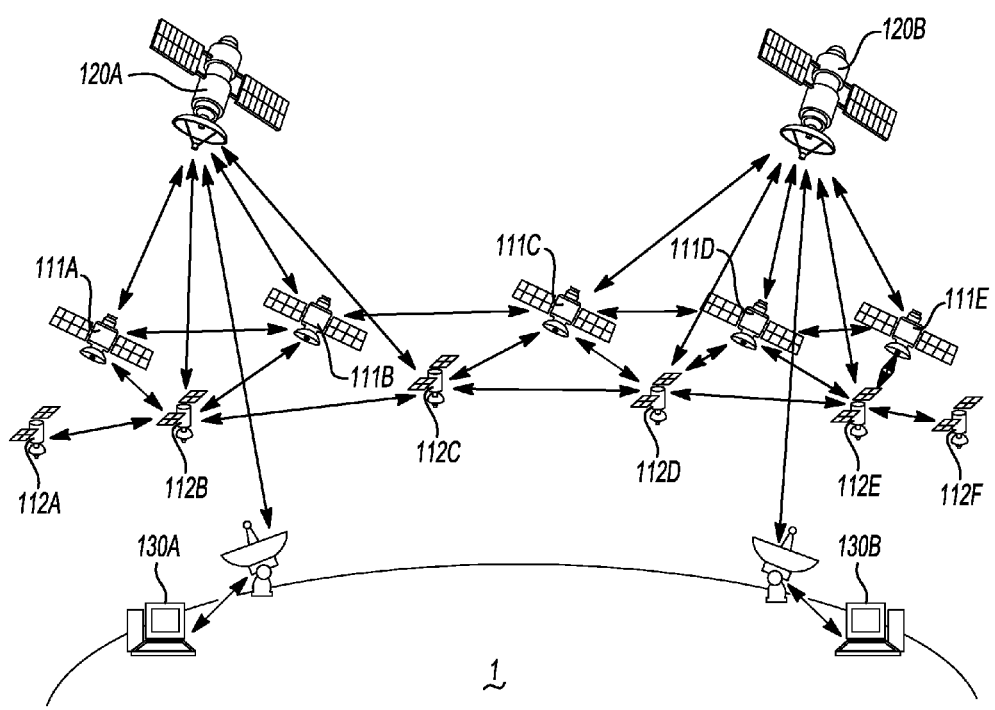
FIG. 2 is a representation of a second embodiment of the satellite cloud network depicting the storage satellites split between 2 orbital planes.
Figure 3:
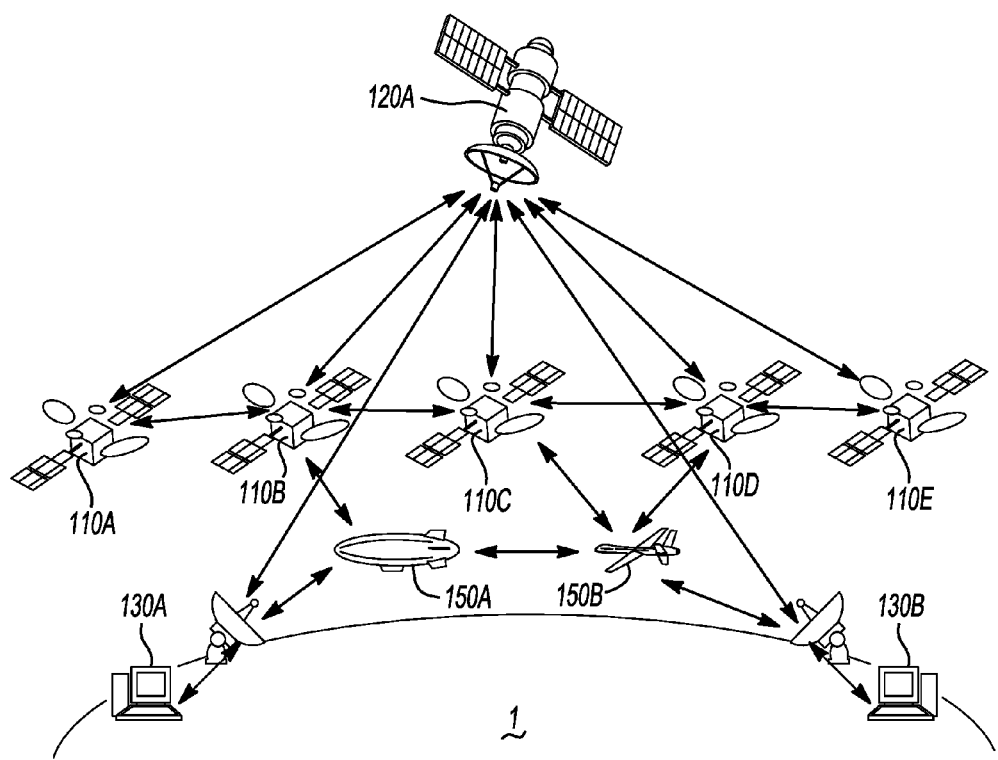
FIG. 3 is a representation of an embodiment of the satellite cloud network incorporating sub-orbital vehicles as additional network nodes.

As illustrated in FIGS. 1-8, the satellite cloud network 100 is comprised of network satellites 110 orbiting a planet (e.g., the Earth) 1 at a first altitude, communications satellites 120 orbiting the Earth 1 at a second altitude, and access terminals (or access points) 130 on the surface of the Earth. Referring to FIG. 3, each network satellite 110 may include a processor 201, a memory 202, a data storage element 203, a TT&C System 204, a power system 205 (including a battery 206 and power source 207), a communications array 209, sensors 210, and an input/output interface 211. A plurality of network satellites 110 occupy low-earth orbits ("LEO") and appear to traverse the sky as they rapidly orbit the planet 1, making them more difficult to track from a ground location. Each network satellite 110 communicates with other network satellites 110, creating a complete satellite network 100 orbiting the planet 1, for the purposes of saving, sending, receiving, storing, refreshing, and/or retrieving electronic data 10 as part of a space-based cloud storage 100.

Some benefits of the network 100 disclosed herein include global accessibility and extreme isolation of orbiting satellites. Hosting an electronic data storage and transfer network 100 in an orbiting loop of network satellites 110 removes a number of limitations affecting modern terrestrial data centers, including global accessibility, unlimited geography, a free source of power, freedom from wired or wireless service provider restrictions, and the elimination of jurisdictional or unauthorized access concerns.

Terrestrial data centers incur significant recurring costs, including leases, mortgages, property taxes, environmental remuneration expenses, and significant energy bills to both power and cool the data center. Space is not owned by any government or organization, so the only recurring expenses relate to maintenance and repair. Additionally, each satellite 110 can be freely and fully powered by solar energy absorbed by the satellite's solar panels 207 or other independent power source.

Wired networks require an uninterrupted physical cable between the user and an internet or leased line/cable access point, and cables require established infrastructure. Current wireless networks require a line-of-sight connection or cover only a limited radius from a service tower or station. Line-of-sight is frequently impaired by geography, the curvature of the earth, buildings, and atmospheric interference. With even a limited number of satellites 110, a satellite cloud network 100 can be accessed by any point on the surface of the earth, and each additional satellite 110 further improves network coverage, storage capacity, and connection. A terrestrial access terminal 130 can communicate with geosynchronous orbit satellites 120 or with non-geosynchronous orbit (e.g., low-earth orbit, elliptical orbit, etc.) satellites 110.

Satellites 110 and spacecraft fall outside of traditional national borders and jurisdictions, and are subject to governmental jurisdiction and oversight only to the extent agreed upon by international treaty, if at all. Currently, according to the Outer Space Treaty, each country retains jurisdiction over both its governmental and non-governmental spacecraft in space. Registering or launching a satellite from a country with more rigid privacy protections may maintain that country's jurisdiction over the satellite 110 and allow a satellite provider to select the optimal country for data privacy, shielding users from casual intrusion or even subpoenas. In this way, data stored in space may be protected from more intrusive territorial jurisdictions and eliminate the risk of subpoena. Additionally, a satellite outside of the traditional national boundaries may be eligible to store data 10 that could not be securely stored in some geographies on the Earth. For example, the European Union has enacted legislation requiring strict protection, standards, and detectability for any service or cloud provider handling European citizens' personal data, and a significant effect of that law is that European personal data cannot be stored in a number of jurisdictions with inadequate privacy protections. Some countries have conflicting laws, complicating issues and increasing costs for cloud service providers—not only in terms of redundant data centers, but also in terms of network handling and legal analysis. An orbital satellite cloud network 100 operating under the laws of an appropriately selected country could securely comply with the personal data privacy requirement. Additionally the satellite cloud network 100 could include geographic limitations that restrict access to restricted data 10 only within approved terrestrial jurisdictions, to preserve personal data privacy. In addition to electronic security from hackers and legal protection from government intrusion, the satellite 110 is inherently secure from nearly any physical intrusion once launched. No terrestrial data center security system can match the protection provided by travelling thousands of meters per second through the vacuum of space hundreds of kilometers above the surface of the earth.

The satellite cloud network 100 is completely isolated from any leased lines, and therefore is free from any fees, throttling, content blocking, or content promotion applied by service providers and network owners, originating from legacy government-granted monopolies or historical investment. A user with a terrestrial access terminal 130 can point his communications array (e.g., antenna, satellite dish, or laser inter-satellite link (ISLs)) toward the network satellite 110 (including communications satellites 120 included in the satellite cloud network 100) without relaying any information through any outside networks. A terrestrial access terminal 130 transmitting via a properly focused beam of communication can send information to the intended satellite 110, eliminating the risk of interception. Similarly a satellite transmitting via a properly focused beam of communication can send information to the intended terrestrial access point without any risk of interception. Additionally, encryption, security keys, and properly recognizing approved geographic access terminals eliminates the risk of digital intrusion.

In some embodiments, the satellite cloud network (SkyCloud™) 100 may operate completely independent and unconnected from the internet. The satellite cloud network 100 has the ability to remain autonomous from the Internet or any other public networks for each end user. Because the satellite cloud network 100 is not interconnected with the internet, the satellite cloud network 100 significantly reduces the risk of unauthorized access from hackers and unauthorized users. In combination with encryption, user authentication tokens, authorized access points, geographic restrictions, and other security protocols, the satellite cloud network 100 provides a completely secure space-based cloud storage network to end-users requiring heightened protection of electronic data 10.

In some embodiments, end-user electronic data 10 is transmitted, stored and replicated (backed-up) redundantly using the satellite cloud network's 100 storage protocols, configurations, procedures, architecture and highly secure hardware-encoded encryption in the access terminal 130 equipment and on communications (Mother) satellites 120 and network (Daughter) satellites 110 in orbit.

In some embodiments, users may generate their own secure multifactor management keys and rights to securely send/receive their own private stored electronic data to/from any communications satellite 120 and/or network satellite 110 to/from any other authorized user of the satellite cloud network 100 (e.g., electronic data sent to/from a ground-based electronic data storage center, or to/from a different end-user location within the same end-user enterprise, etc.). For added data security, users may wipe or expunge local copies or transitory copies of their data 10 as the data 10 is transmitted and stored to the network system 100.

In some embodiments, the stored electronic data 10 is available only to authorized end-users (e.g., those end-users in possession of secure multifactor authentication keys and/or biometric protocols required for access to their part(s) of the satellite cloud network (SkyCloud) 100. The satellite cloud network 100 is configured to redundantly store data 10 across multiple data storage elements 203 in multiple network satellites 110, applying site diversity and multiple encrypted wireless pathways/signals. Each access terminal 130 or end-user is uniquely identified to securely and redundantly preserve ownership and control of the end-user's electronic data 10 on the satellite cloud network 100. In some embodiments, and where jurisdictional isolation is required, electronic data 10 belonging to any end-user is accessible in only the territories and/or jurisdictions allowed by the end-user and applicable law without exposure to any unintended networks or jurisdictions.

In some embodiments, the stored electronic data is securely transmitted to/from end-users using a communications access terminal 130 to wirelessly communicate with a communications satellite 120 having service coverage over the relevant geographic region of the access terminal 130. As previously discussed, the satellite cloud network 100 is configured to be modularly expanded to incorporate additional network satellites 110 and to support additional end-users and access terminals 130 through future addition of communications (Mother) satellites 120 and network (Daughter) satellites 110 into orbit.

The altitude or distance above a planet 1 determines the required velocity for any satellite to maintain a stable orbit, with the lowest altitude orbits requiring the highest velocities so that the satellite's kinetic energy balances the potential energy, preserving a stable orbit. The altitude or distance above the earth also determines the minimum number of network satellites 110 required to provide continuous communication between 110 satellites, as the curvature of a planet 1 interferes with communication between distant network satellites 110 at lower orbital altitudes. The higher the orbital altitude for the network satellites 110, the fewer network satellites 110 are required to form a continuous communication network 100.

However, at certain orbital altitudes above the Earth 1, a satellite's orbit travels through the Earth's Van Allen radiation belts, which can damage electronics and especially impairs electronic data storage. The inner Van Allen radiation belt is a region of intense radiation extending in a roughly toroidal shape from approximately 4,500 to 7,600 miles (roughly 7,250 to 12,250 kilometers) from the center of the earth or 600 miles to 3,700 miles above the surface of the earth (roughly between 7,300 and 12,700 kilometers). The outer Van Allen belt is a region of intense radiation extending from approximately 12,000 to 41,000 miles (19,300 to 66,000 km) above the center of the earth with a peak intensity between 20,000 and 30,000 miles (32200 to 48300 km) above the center of the earth. A geosynchronous (or geostationary) orbit requires an approximate orbital radius of 26,199 miles (42,164 km) from the center of the earth (or 22,236 miles (35,786 km) above mean sea level), causing a geostationary ("GEO") satellite to travel through the highest intensity radiation region around the earth. Some satellites including those with orbital altitudes entirely within the inner Van Allen belt do not require the significant shielding and mass required to protect GEO satellites. The intense radiation within the Van Allen belt can significantly and negatively impact electronics on geosynchronous orbital satellites, requiring significant shielding, which increases mass and launch cost.

In the present embodiment, an access terminal 130A communicates directly with a geostationary orbiting communications satellite 120A that occupies a fixed apparent position in the sky relative to a fixed point on the ground.

The communications satellite 120A establishes a communications link with a network satellite 110A within range, and through that first network satellite 110A, a link is formed with every other network satellite 110. Instead of directly tracking and communicating with the LEO network satellite 110 as they quickly traverse the sky, access terminal 130A establishes a communication link with communications satellite 120A, through which a link is established between access terminal 130A and any network satellite 110. If network satellite 110A travels out of range of communications satellite 120A or if communications satellite 120A is capable of establishing a better communications link with another network satellite (e.g., network satellites 110B, 110C, 110D, 110E, 110F, 110G, or 110H), then communications satellite 120A accesses the network satellites 110 through that other network satellite. Communications satellite 120A continues to swap which network satellite 110 is linked, providing continuous access to the entire satellite cloud network 100.

The satellite cloud network 100 is configured to remotely store information or data 10 in network satellites 110 including data storage elements 203 configured to store and retrieve data 10 and communications arrays 209 configured to communicate that information 10 to the access terminals 130 or to other satellites 110, 120. As illustrated in FIG. 1, the satellite cloud network 100 includes a plurality of intercommunicating network satellites 110, each configured to store data 10, and each capable of sending data 10 to or retrieving data 10 from the other network satellites 110 through a communications network (e.g., laser inter-satellite link (ISL) or radio frequency communication). A user can access data 10 stored on any of the connected network satellites 110 by establishing a communications link with any one network satellite (e.g., 110A), and accessing data 10 stored on any other network satellite (e.g., 10B, 110C, 110D . . . ) through network satellite 110A. In one aspect, the network satellites 110 may occupy a low earth orbit (e.g., an orbital altitude between 160 kilometers and 2000 kilometers above the earth's surface). As described above, access terminals 130 transmit data 10 to and retrieve data 10 from geosynchronous communications satellites 120 (or any communications satellite at any orbit or position), and the communications satellites 120 transmit data 10 to or retrieve data 10 from the network satellites 110. This system configuration enables a terrestrial access terminals 130 to maintain a continuous connection with the communications satellite 120 while the communications satellite 120 re-transmits data to the plurality of network or storage satellites 110. In other embodiments, terrestrial access terminals 130 may communicate directly with the plurality of intercommunicating network or data storage satellites 110.

FIG. 1 illustrates an embodiment of the satellite cloud network 100 depicting a plurality of network satellites 110A, 110B, 110C, 110D, 110E communicating wirelessly between each other and occupying a single orbital plane (ORB1) above a planet or celestial body 1. A communications satellite 120A is positioned in geostationary orbit and wirelessly communicates with each network satellite 110 within range as well as with one or more access terminals 130A, 130B on the surface of planet 1.

The lines between various network satellites 110 illustrate bidirectional communication links between different elements of the wirelessly interconnected network 100, each line potentially communicating electronic data and/or instructions 10. Each element of the network 100 securely transmits electronic data 10 for storage, retrieval, and distribution to access terminals 120 anywhere on planet 1 or to any other element of the network 100 through the bidirectional communication links and retransmitted from network satellite 110 to network satellite 110 until the data 10 has reached its destination (be that a network satellite 110 or access terminal 130. Unlike traditional passive or active communications satellites that simply reflect or amplify and immediately rebroadcast a received signal, the network satellites (110A, 110B, 110C, 110D, and 110E) record a file containing data extracted from the signal to electronic data storage elements 203 within the network satellites 110. That file can be requested and retrieved at any time from any authorized location within the satellite cloud network 110 (until the file is intentionally deleted or replaced). In some embodiments, once a network satellite 110 records a file from a signal, the network satellite 110 may perform additional tasks such as de-duplication, compression, and/or encryption to create a processed file. In further embodiments, the network satellite 110 may then transmit the processed file to at least one other satellite 110 in the network 100 to provide a redundant data back-up. In other embodiments, the network satellite 110 directly transmits the file as received without processing as a redundant backup. A later request to access the file may be simultaneously fulfilled by each network satellite 110 storing a copy of the file. The file may be broken up into smaller file pieces for storage and speedy transmission and re-assembled at the requesting access terminal 130.

Additionally in some embodiments, the satellite cloud network 100 employs storage protocols, procedures, satellite architecture, network management and communications systems to securely store, buffer and/or forward the electronic data 10 to/from the communications satellites 120, correct the data 10 for any transmission errors, and then transmit the data 10 to/from a network satellite 110 for storage, redundant back-up and retrieval by any number of communications satellites 120, network satellites 110 and/or access terminals 130. In other embodiments, to improve the security and reliability of back-up data, the electronic data 10 is further transmitted among the communications satellites 110.

The satellite cloud network 100 can authenticate the users associated with access terminal 130A and access terminal 130B prior to allowing the sending and/or retrieving of electronic data 10 through focused, encrypted wireless communications. The data 10 can be transmitted via wireless and/or wired connections to and from one or more computers, mobile devices, or electronic data recording devices.

Encrypted electronic data is transmitted to/from access terminal 130A and/or 130B using at least one wireless signal to any available satellite 110A, 110B, 110C, 110D, 110E to be distributed for storage and retrieval to any number of network satellites 110 or end-user via the space-based cloud storage and cloud networking system 100.

In the embodiment depicted in FIG. 1, the network satellite signals extend beyond 110A and 110E, and the lines extending beyond network satellites 110A and 110E indicate connections with other satellites (not shown) to form a continuous satellite cloud network 100 for providing service to end-users located anywhere on, above or around the planet or celestial body.

In some embodiments, the network 100 incorporates network architecture, devices, protocols, procedures, systems, encryption, multifactor authentication, anti-jamming and interference mitigation techniques, and wireless inter-satellite and ground links are utilized to distribute electronic data 10 to any other point in the satellite cloud network 100 and/or to any authorized end-user with access terminals 130 on or near planet 1. Additionally, in some embodiments, encryption, fast frequency hopping, narrow beam pointing, isolation, and optical laser transmission modulation may be employed to restrict unauthorized user or geographic intrusion.

With reference to FIG. 2, an embodiment of a space-based electronic data storage and transfer network system 100 is shown illustrating a plurality of network satellites 111A, 111B, 111C, 111D, 111E orbiting within a first orbital plane (ORB1) and a plurality of network satellites 112A, 112B, 112C, 112D, 112E, 112F orbiting within a second orbital plane (ORB2). The satellites 111, 112 in each of the orbital planes ORB1, ORB2 may be configured to communicate wirelessly together forming meshed connectivity from multiple orbits ORB1, ORB2 at any altitude above planet 1 at any given time. FIG. 3 depicts a primary fleet of network satellites 111 incorporating electronic data storage elements 203 on ORB1 communicating through wireless signals with a redundant (back-up) fleet of network satellites 112 incorporating electronic data storage elements 203 on ORB2, each securely transmitting electronic data to/from end-users located in various geographical regions and to/from other satellites. The network 100 may be configured to store a primary copy of a file in a network satellite 110 in a first orbital plane ORB1 and a redundant back-up copy of a file in a network satellite 110 in one or more other orbital planes (e.g., ORB2). By placing primary stored data 10 on network satellites 110 in one orbital plane and redundant (backed-up) stored data on network satellites 110 in another/separate orbital plane, the risk of accidental loss (e.g., orbital debris in the orbital plane impacting and destroying all stored copies of the electronic data 10) is significantly minimized.

In an alternate embodiment (not shown), each orbital plane may operate entirely independently from each other, completing multiple independent, self-contained satellite cloud networks 100A, 100B, 100C. Certain enterprises such as a branch of the military may desire a private, dedicated, completely secure satellite cloud network 100, immune to unauthorized access and insulated from cross-traffic.

In some embodiments, the encrypted electronic data 10 stored on the space-based cloud storage network 100 may be retrieved by any authorized end-user with a compatible access terminal 130, from various geographical and aerial locations and authorized through multiple security keys. As part of the cloud storage and networking functions of the system 100, end-users can also send electronic data 10 of any kind to one another using any applicable part of the wirelessly interconnected system 100.

Turning to FIG. 3, an embodiment of the network 100 illustrating a plurality of network satellites 111A, 111B, 111C, 111D, 111E orbiting within an orbital plane and communicate with communications satellite 120A and ground-based access terminals 130A, 130B, similar to the embodiment of FIG. 1. However, the embodiment of FIG. 3, further include sub-orbital elements 150A, 150B. Although FIG. 3 illustrates an airship 150A and a drone 150B, it should be understood that other sub-orbital elements including, but not limited to, those listed and described in this patent could be included. In one embodiment, sub-orbital elements 150 function similar to storage satellites 110. In another embodiment, sub-orbital elements 150 function similar to storage satellites 110.

With reference to FIG. 3, each network satellite 110 may include a power system 205, one or more communications arrays 209, one or more data storage elements 203, and a control system 212. The control system 212 comprises a processor 201 and a memory 202 (including both persistent and non-persistent memory). The power system 205 comprises a battery 206 and a power source 207.

Within the control system 212, one or more processors 201 may be connected to persistent and/or non-persistent memory 202 and control the operation of the network satellite 110, including the power system 205, the communications array 209, and the data storage elements 203. Multiple network satellites 110 can pool processing power to jointly manage computation for complicated processes. The processors 201 or the data storage elements 203 may include encryption and/or deduplication instructions to protect data and to optimize storage. Deduplication or compression may occur in network satellites 110, communications satellites 120, access terminals 130, or at any other computing device between the user and the eventual data storage element 203. The processors 201 may also include an authorization system to check credentials for an access terminal 130 and make certain that the access terminal 130 is authorized to send or retrieve data 1 prior to providing access to the data storage element 203.

The data storage element 203 is powered by the power system 205 and is coupled to the communications array 209 through the processor. The data storage element 203 may comprise magnetic hard drives, flash memory, 3D NAND memory, holographic memory, and/or any other device capable of and configured to store data or information 10. In one embodiment, the data storage element 203 of a single network satellite 110 is capable of storing between 1 and 5 petabytes of data. The price and volume per byte, kilobyte, megabyte, gigabyte, terabyte, petabyte, and beyond decreases with time. In other embodiments, network satellites 110 including a data storage element 203 capable of significantly increased storage beyond 5 petabytes could be preferable. In other embodiments, a network satellite 110 including a data storage element 203 capable of storing less than 1 petabyte of storage may be preferable (e.g., for a single enterprise server, or a satellite intended for limited duration storage).

The data storage elements 203 may be specially configured and mounted to dampen the pressure and vibration during launch, the temperature and pressure extremes in the vacuum of space, and/or radiation exposure outside of a planetary atmosphere and magnetic field. The data storage elements 203 may be shielded to minimize radiative interference. The data storage element may include the ability to flip or rewrite any corrupted bits. Data storage elements may be modular, replaceable, or expandable. In one embodiment, a magnetic hard drive may be pressurized and sealed to enable operation in a vacuum.

In some aspects, the data storage element 203 may suspend writing data 10 to the data storage element 203 or completely power down during periods of intense radiation to minimize damage. Any instruction or data 10 received during disabled or suspended recording periods may be returned to the originating network satellite 110 or directed to another network satellite 110 outside of the intense radiation threat. If the instruction or data 10 is received from a communications satellite 120 or relay satellite 140, the instruction or data 10 may be directed to an alternate network satellite 110 configured for data storage for recording.

The data storage element 203 may also be configured to be capable of entering a low power or idle mode. The low power or idle mode may be beneficial to conserve power consumption, reduce heat, or disable some of the data storage elements 203 during low traffic periods. In some embodiments, a network satellite 110 may switch one or more data storage elements 203 from an idle state to an active state when an end-user initiates a connection or begins sending or retrieving data 10 to/from the satellite cloud network 100 (or to the specific network satellite 110 or specific data storage element 203) to preserve memory chip array lifespan, to conserve power consumption, to minimize unnecessary radiation exposure (and resulting errors). The data storage elements 203 may redundantly store data 10 on multiple locations within and between network satellites 110 to securely back up data 10. In some cases, the network satellite may be configured so that an instruction 10 received at the communications array 209 from another network satellite 110 may bypass the processor 201 and go directly to the data storage element 203 to be recorded. This bypass may be triggered by a bypass command included along with the data or instruction 10 received from the other network satellite. The bypass command may be generated and incorporated with the transmission of the data or instruction 10 at the access terminal 130, by a communications satellite 120, or by another network satellite. With reference to FIG. 1, network satellite 110A may record data 10 to a data storage element 203 in network satellite 110A and recognize that network satellite 110D is an ideal back-up location, therefore retransmitting the data along the satellite cloud network 100 with a bypass trigger to be directly and redundantly stored on network satellite 110D.

Within the power system 205, one or more power sources 207 (e.g., a solar panel, thermal harvesting, atomic fusion, atomic fission, chemical decay, or a free electron gathering system) are electrically coupled to one or more batteries 206. A solar panel 207 can collect solar energy to power the network satellite 110 and charge the batteries 206. The batteries 206 provide back-up power when the network satellite 110 is shaded from the sun's rays by a planet or other body. In one aspect, the storage satellite 110 includes robotics and electronic instructions capable of opening and closing the solar panel 207 or directing the solar panel 207 toward or away from the source of light to increase or decrease the energy absorbed. It may be beneficial to increase energy absorption prior to entering or just after leaving the earth's shadow. It may additionally be beneficial to decrease energy absorption when the battery 206 is near full or the network satellite 110 needs to reduce thermal energy (temperature).

Figure 4:
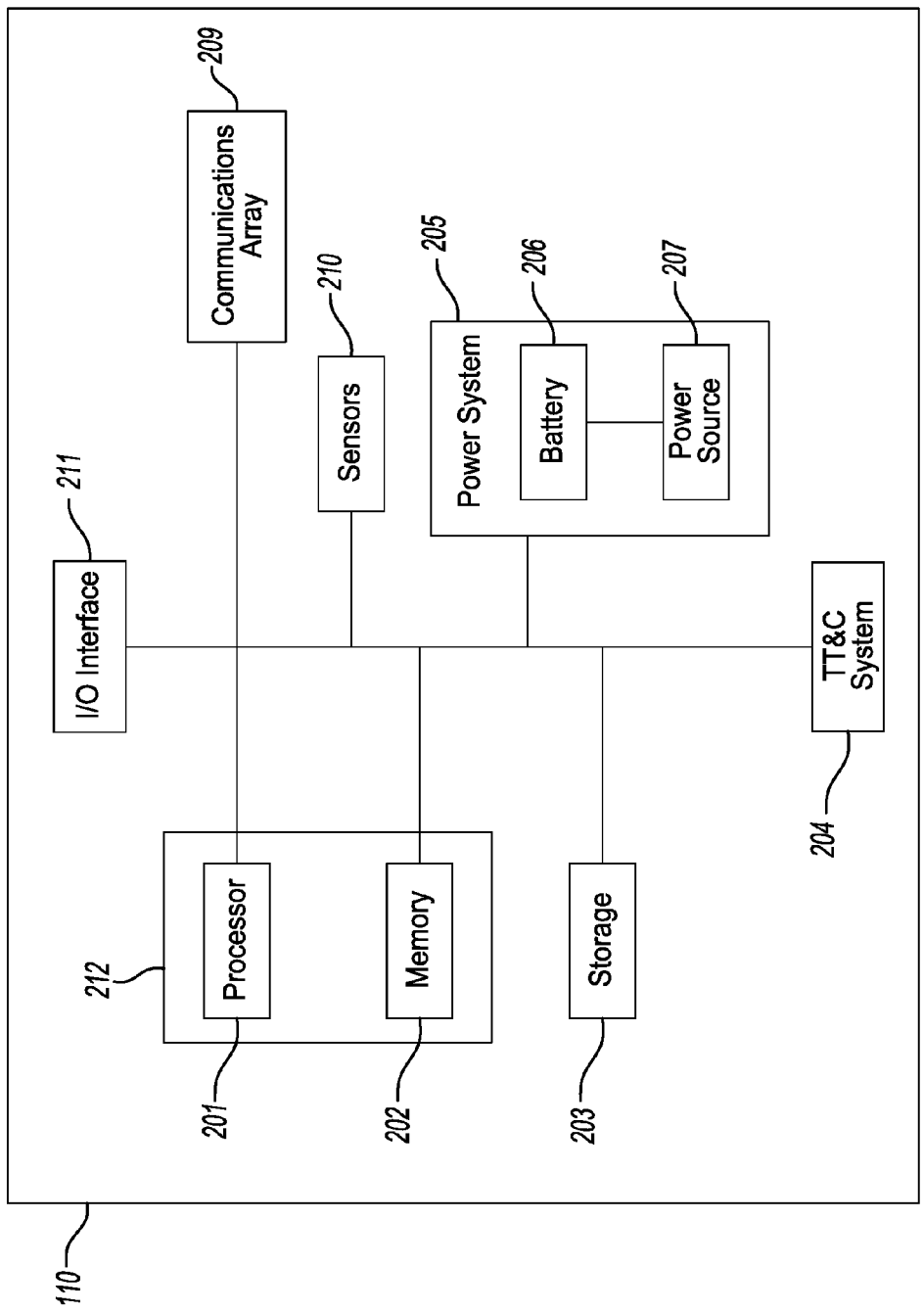
FIG. 4 is a block diagram of an exemplary computer system adaptable for use in the storage satellites of the present invention.

The communications array 209 may include a wireless communications system (e.g., laser inter-satellite link (ISL), microwave relay, or radio frequency transmission) configured to communicate with the other network satellites 110 (or with communications satellites 120 or access terminals 130). In one aspect, and as best depicted in FIG. 4, the communications array 209B of a first network satellite 110B is in constant communication with the communications arrays 209 of the leading network satellite 110A immediately in front and the trailing network satellite immediately behind 110C. The network satellites 110 create a continuous network 100, allowing any network satellite 110 to send data and instructions 10 to or retrieve data and instructions 10 from any other network satellite 110 in the network 100. In another aspect, each network satellite (e.g., 110B) is additionally capable of communicating with two or more network satellites ahead (e.g., 110A and 110H) and two or more network satellites behind (e.g., 110C and 110D) to improve network reliability and performance. If any satellite stops working, all remaining storage satellites remain in network communication by skipping over the non-functioning satellite 110. Alternatively, if any satellite 110 stops functioning, the network 100 can instead route data through the continuous loop in the opposite direction. Additional or redundant satellites 110 can also increase the flexibility and survivability of the network system 100.

Figure 5:
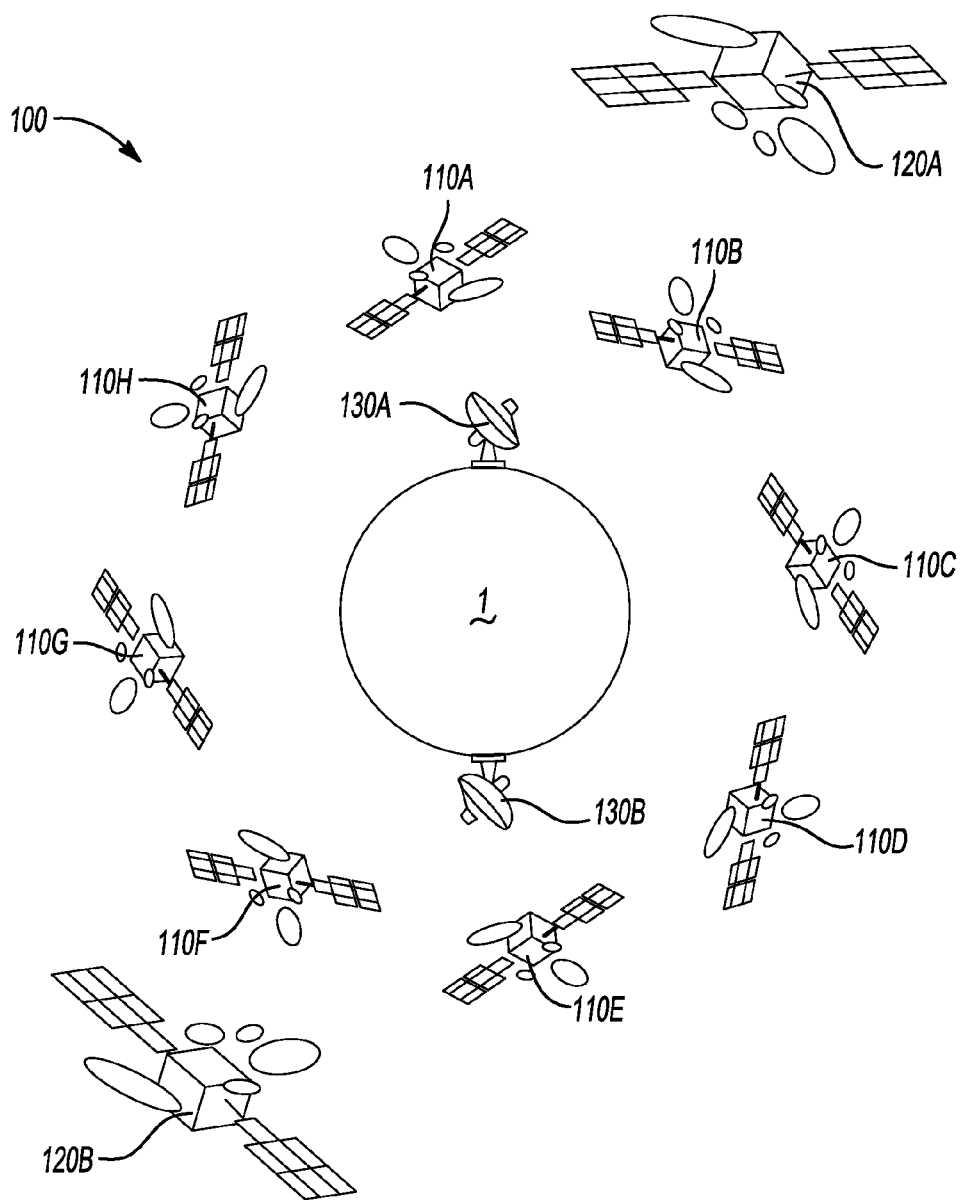
FIG. 5 is a planar representation of an embodiment of the satellite cloud network depicting the storage satellites and communications satellites distributed around the Earth.

With reference to FIGS. 1 and 5, through its communications array 209 of a network satellite 111 may also communicate with other network satellites or relay satellites 112 in alternate orbital planes or orbital radii. In one aspect, the communications array 209 can simultaneously send and retrieve data and instructions 10 with multiple communications satellites (e.g., 120A, 120B), and each communications satellites 120 can simultaneously send and retrieve data and instructions with the access terminals 130, thereby increasing the bandwidth of the network 100. In another embodiment, the communications array 209 on a network satellite 110 can send and retrieve data and instructions 10 directly with an access terminals 130.

In another embodiment, if an inter-satellite link system (in the communications array 209) in one network satellite (e.g., daughter satellites, relay satellites, or storage satellites) 110 becomes totally disabled in directions required for communications with other network satellites 110, either the affected satellite 110 or the network 10 could generate instructions to entirely isolate or quarantine the affected satellite 110 from the network 10. In some cases, the isolated network satellite 110 may transmit its stored data 10 to one or more communications satellites 120, which will in turn transmit the data 10 to another non-isolated network satellite 10. This data rerouting may be temporary to provide temporary back-up routing during temporary communications interruptions. In some instances, all data 10 may be permanently transferred from an isolated network satellite 110 if the communications loss is extended or permanent. In some cases, the isolated and backed-up network satellite 110 may then be wiped of all data 10 or destroyed to maintain data security.

In some embodiments, the network satellite 110 could include a position determining system, and a guidance or propulsion system so that the network satellite 110 can self-correct for orbital decay or adjust satellite spacing to optimize the failure, addition, or subtraction of other network satellites 110 into the satellite cloud network 100.

In some embodiments, navigation and fleet management of communications satellites 120 and network satellites 110 are performed by Telemetry, Tracking and Control ("TT&C") stations (not shown) placed on planet 1 where geographically desired. The TT&C functions do not control the electronic data storage network management functions. Rather, these are wirelessly controlled by a network control center. Network satellite 110 TT&C monitoring and requests can be transmitted directly from the ground to any network satellite 110 which can in turn relay the TT&C transmissions to any other network satellite 110 wirelessly connected to the satellite cloud network 100. The network 100 can also accept network satellite 110 TT&C transmissions indirectly via wireless links from the TT&C Stations to any communications satellite 120 to be wirelessly relayed to the intended network satellite 110 accordingly.

At the network control center's discretion, the management of private electronic data storage network protocols, procedures, software and secure encryption on the entire satellite network 100 can be autonomously conducted among the communications satellites 120 and network satellites 110 without the need for assistance from any ground-based communications station.

In some embodiments, the network satellite 110 includes radiation and thermal shielding and other structural and support elements to improve the performance, reliability, and survival of network satellite 110. In further embodiment, the beneficial support element comprises a shock-absorbing system to minimize the vibration or thrust effects of launching the network satellite 110 into orbit. In another embodiment, the beneficial structural element may include mirrored surfaces to minimize unwanted thermal absorption. In some embodiments, the network satellite 110 is configured and dimensioned with a heat management system to optimize heat absorption and dissipation in a vacuum. Solar exposure and electronic elements produce heat, even in a vacuum, and conduction and convection are nearly non-existent in the vacuum of space, so satellites must optimize thermal energy through manipulating the dispersal and radiative dissipation of thermal energy, and this heat management may include energy capture from heated elements, increased surface area (e.g. heat sinks) on some surfaces, and/or satellite rotation to avoid over-heating any side of the network satellite 110 due to prolonged solar exposure.

In some embodiments, the network satellites 110 may also include signal processors, digital processors, routers, controllers, software, switches, proximity detection, collision detection, temperature detection, and/or radiation detection to increase the security and survivability of the network satellite 110. In a further embodiment, a network satellite 110 may include a self-destruct and/or self-erase element, which may include an explosive, an electromagnetic pulse, a memory ejector, and/or a memory wipe element. A self-destruct and/or self-erase element may be activated if unauthorized access is detected or if a network satellite 110 experiences a significant collision, a decaying orbit, or is scheduled to be decommissioned.

A relay satellite 140 is a specific type of network satellite 110 that may include similar elements as other network satellites 110 and occupy the same (or alternate) orbital planes and altitude, but unlike network satellites 110 used for data storage, relay satellites 140 are not used to store user data 10. Relay satellites 140 may include reduced data storage elements, capable of only temporary storage until that piece of data 10 can be transmitted to and stored on another network satellite 110 intended and configured to be used for data storage. Relay satellites 140 may be inserted into the satellite cloud network 100 to complete the network ring or to provide additional in-network bandwidth by providing multiple alternate communications paths for data 10.

As best shown in FIG. 5, different types of network satellites 110 may be incorporated into a single satellite cloud network 100 or even into a single orbital radius or plane of a satellite network 100. In FIG. 5, network satellites 111A, 111C, 112B, 112D, and 112E may be configured for data storage. Network satellites 111B, 111D, 112A, 112C, 112D, and 112H may be relay satellites 140 configured to improve the overall network bandwidth or accessibility. Network satellites 112F, 112G, and 112I may be a third type of network satellite, different from the relay satellites and the previously mentioned storage satellites. In one embodiment, network satellites 112F, 112G, and 112I incorporate a new type of data storage not originally available when the first generation of network satellites were launched. In an alternate embodiment these network satellites may incorporate a new communication protocol for use with newer communications satellites or for direct communication with access terminals 130A, 130B. In still another embodiment, some network satellites 100 may perform alternate functions, such as long-distance communication, interstellar observation, or Earth-status monitoring. Some examples of Earth status monitoring satellite tasks incorporated into a network satellite 110 may include monitoring weather, pollutants, traffic, air traffic, troop movement, or specific tasks relating to national defense, surveillance, or communications interception. For example, in one embodiment, a weather network satellite 110 may transfer a data 10 to a surveillance network satellite 110, which may in turn transfer the data 10 to a storage network satellite 110.

One specific embodiment of a relay satellite 140 comprises new types of communications arrays 209 configured to communicate with future communications satellites 130Z (not shown) using technologies, standards, or bandwidths not included on earlier network satellites. Because relay satellites 140 include fewer components, they may be smaller, lighter, and cheaper to launch into orbit than network satellites 110 intended for storage. A network could function with as few as one network satellite 110 configured for storage with all other network satellites in the examples replaced by relay (or "granddaughter") satellites 140 capable of completing the network chain.

Communications satellites 120 may possess similar equipment as network satellites 110 or relay satellites 140. Communications satellites 120 and network satellites 110 communicate with end-users and with each other via optical laser inter-satellite links (ISLs) and/or via any approved radio frequencies (e.g., X-band, Ku-Band, Ka-band, V-band, W-band, Q-band, C-Band, L-Band, S-Band, or any other ITU-recognized frequency) approved for use by the authorized United Nations governing body, the International Telecommunications Union (ITU). Other frequencies and communications protocols not approved by the ITU may also be incorporated.

In some embodiments, communications satellites 120 may simultaneously track and radio frequency transmit and/or optically laser link (ISL) with other communications satellites 120 and one or more network satellites 110, and each network satellite 110 may simultaneously track and radio frequency transmit and/or optically laser link (ISL) with communications satellites 120 and one or more other network satellites 110, forming an autonomously reliable and redundant self-contained electronic data cloud communications and storage network 100. In some autonomous embodiments, the satellite network 100 may continue to operate without further command or control from any ground-based network control center. If a network control center is destroyed, damaged, disabled, or hacked, the satellite network 100 will continue functioning according to the most recently received authorized instruction. The satellite network 100 may adjust the most recently received authorized instruction according to changing parameters, such as communications losses, corrupted data storage sections, proximity detection, orbital adjustments, collision avoidance, and additional network satellite 110 additions without requiring specific instructions from the ground-based network control center.

Through the satellite cloud network 100, electronic data 10 may be privately and securely accessed by end-users from any region on Earth, or any other planet or celestial body covered by the satellite cloud network 100, making the electronic data available for transmission to/from any number of communications (Mother) satellites 120 and network (Daughter) satellites 110 connected to the same satellite cloud network 100. Users can communicate directly and privately with communications satellites 120 and/or network satellites 110 for storage, transmission, back-up and retrieval purposes, and users may also use the satellite cloud network 100 system as a bidirectional autonomous network for secure electronic data (storage and transmission), email, information and message delivery to other users of the satellite cloud network 100.

As best depicted in FIG. 4, users may share their electronic data 10 through the satellite network 100 with other authorized users through the satellite network 100 as an electronic data storage and distribution method. In one embodiment, a user located at access terminal 130A may intend to transfer data 10 quickly and securely to a user located at access terminal 130B on the opposite side of the planet 1. Access terminal 130A transmits the data to communications satellite 120A. Communications satellite 120A transmits the data 10 to the nearest network satellite 110A. Network satellite 110A transmits the data 10 to another network satellite 110H. Network satellite 110H transmits the data 10 to another network satellite 110G. Network satellite 110G transmits the data 10 to another network satellite 110F. Network satellite 110F transmits the data 10 to communications satellite 120B. Communications satellite 120B transmits the data 10 to access terminal 130B, where the user retrieves the data 10. In another embodiment, the data 10 may travel multiple paths simultaneously. For example, after the data 10 was transmitted from access terminal 130A to communications satellite 120A, communications satellite 120A may transmit the data along path 130A-120A-110A-110H-110G-110F-120B-130B and simultaneously along path 130A-120A-110B-110C-110D-110E-120B-130B. Data 10 may travel along as many paths as are currently available and desirable. Data 10 may be deconstructed at access terminal 130A (or any other point in the communications chain) and reconstructed at access terminal 130B (or any other point in the communications chain). In some embodiments data 10 is separated into smaller data packets and single data packets or groups of data packets may be independently routed to its destination. In some embodiments, additional processes including data packet combination, error-correction, redundant copying, retransmission, storage, and/or computations may be performed with the data or data packets either at the destination or at some point along the transmission route. In some embodiments, data packets may be processed and transmitted similar to the way data 10 is handled between satellites and terminals.

Users may also communicate directly with the satellite cloud network 100 through their own user-controlled access terminal 130 without relying on any unsupervised data routing nodes to avoid any risk of potential intrusion or security breach that may be possible through alternative networks such as ground-based internet facilities and/or communications cables. Users may communicate directly and privately with the communications or network satellites 120, 110, and users may also use software applications (or software as a service) such as SQL, Oracle Database and SAP, and video, fund transfer, email, and message delivery applications to other users.

In an additional embodiment, the satellite network 100 may function to discriminately broadcast data 10 to all or some access terminals 130. This broadcast access may allow simultaneous access to the data 10 from multiple access terminals 130 around the planet 1. Additionally, the network 100 may disable access from certain geographies, geofences, or jurisdictions to comply with jurisdictional or user requirements. For example some nations or states may require heightened data security for certain information (e.g., user healthcare records, user behavior or history, or banking information), which may conflict with some other jurisdiction's rules regarding mandatory government access to locally accessible data 10. In another example, one state may embargo certain data from being transmitted to or shared with another state, such as information relating to defense or encryption. In still another example, an entity may simply wish not to expose its information to subpoena in certain jurisdictions. The network 100 may disable access from certain territories to minimize such unintended jurisdictional consequences, either according to legal requirements or to user preferences.

In one embodiment, all network satellites 110 occupy a single orbital plane. This orbital plane could be aligned with a planet's equator or could have any inclination or phase shift to the equator.

With respect to FIG. 5, sections of a data or instruction 10 for a point-to-point transmission or even a data duplication transmission may travel multiple paths along multiple planes or radii to reach a destination and be reconstructed. For example, data 10 intended to pass from network satellite 11A to network satellite 11B may be simultaneously or asynchronously transmitted along path 1) 111A directly to 111B, path 2) 111A to 112B to 111B, path 3) 111A to 112 C to 111B, and path 4) 111A to 111D to 111C to 111B. As in previous examples, data 10 may travel along as many paths as are currently available and desirable or cost effective.

Figure 6:
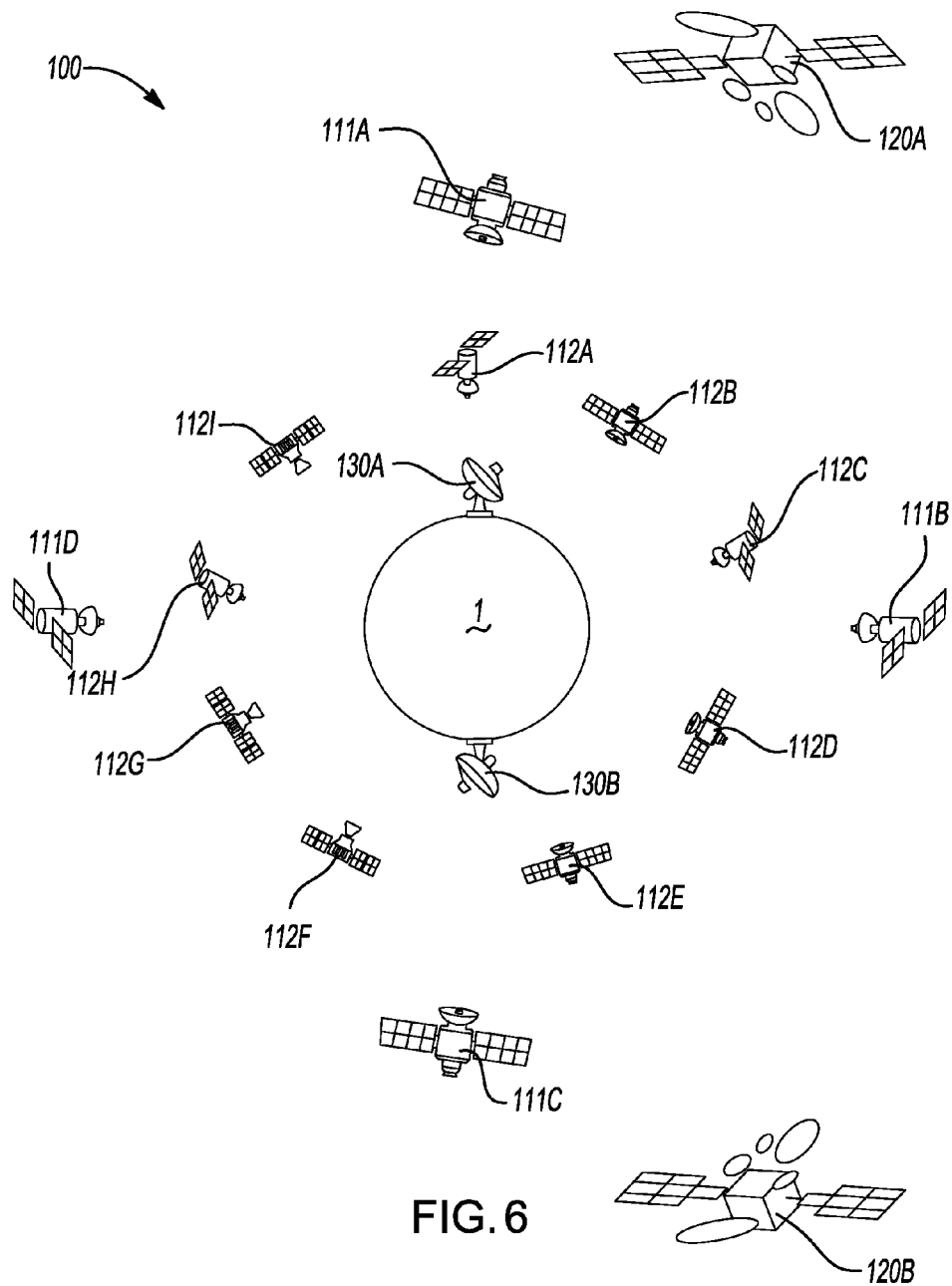
FIG. 6 is a planar representation of an embodiment of the satellite cloud network incorporating different types of network satellites in a single satellite network or constellation distributed around the Earth.
Figure 7:
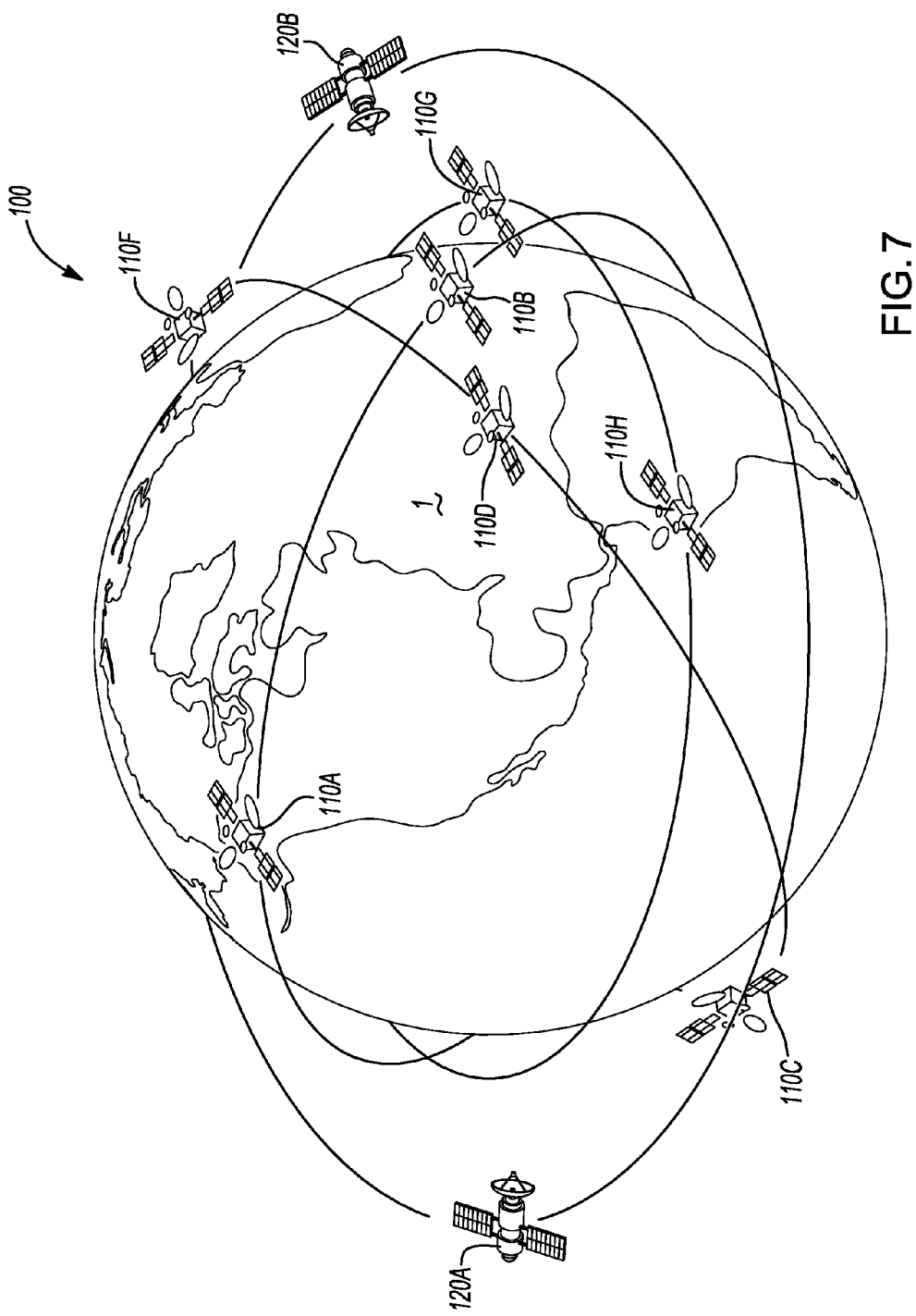
FIG. 7 is a representation of an embodiment of the satellite cloud network depicting the storage satellites split between 3 orbital planes about the Earth.
Figure 8:
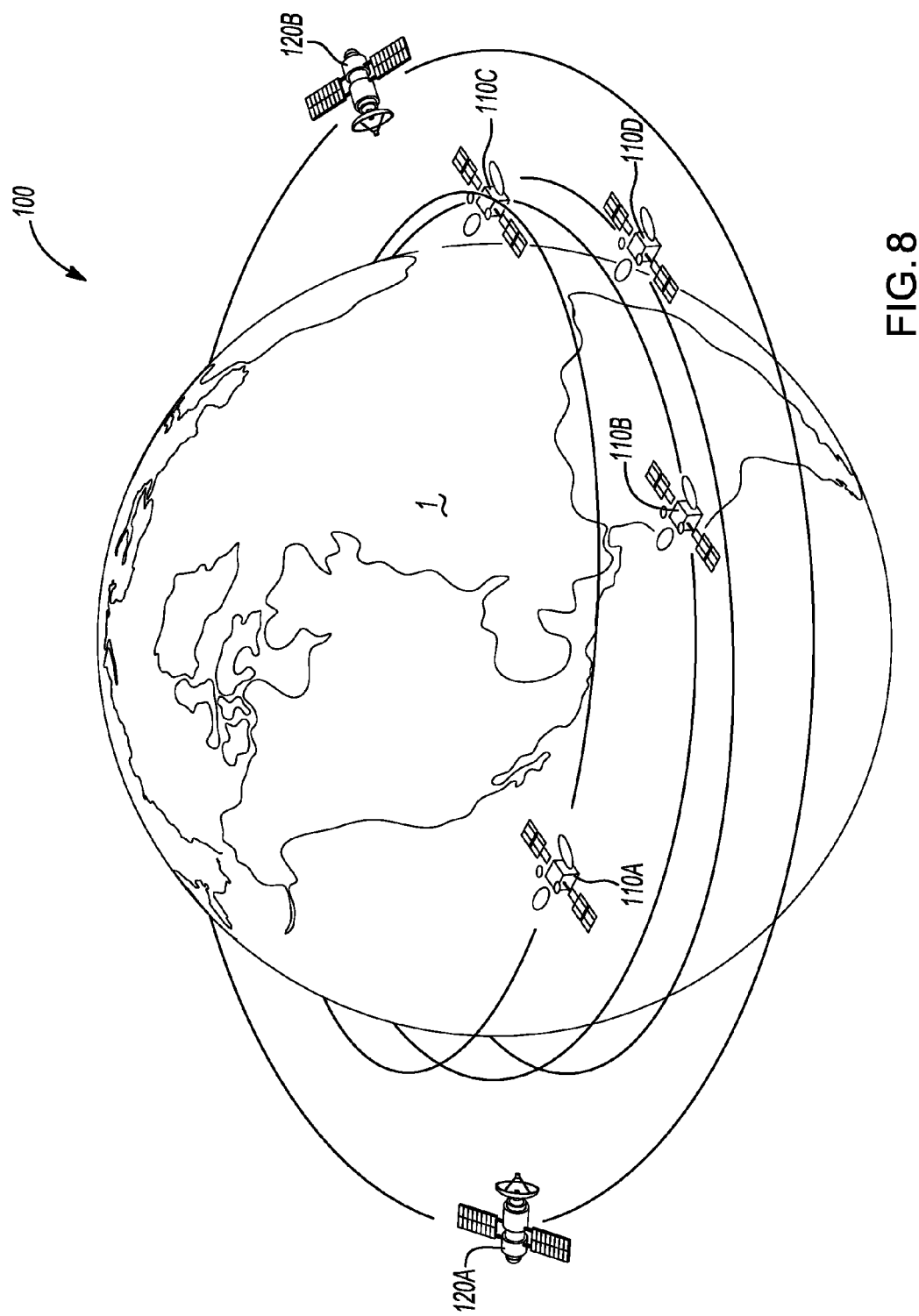
FIG. 8 is a representation of an embodiment of the satellite cloud network depicting the storage satellites split between 3 perpendicular orbital planes about the Earth.

In an alternate embodiment, as shown in FIG. 6, the network satellites 110A-H are intentionally split into multiple orbital planes, increasing planetary coverage and decreasing the chance that a single piece of space debris could disable the entire network 100 through a series of collisions. The network satellites 110 may be distributed equally or unevenly across multiple orbital multiple orbital planes. Each orbital plane of network satellites 110 may form its own continuous independent network loop or multiple orbital planes may be interconnected to form a larger network. Network satellites 110 from one or more orbital planes may communicate directly with the same set of communications satellites 120A or 120B. In an alternate embodiment, network satellites 110 from different orbital planes communicate with different communications satellites 120. In some embodiments, some or all of the network satellites 110 are coplanar with one or more communications satellites 120 (e.g., network satellites 110H, 110G are coplanar with communications satellites 120A, 120B). In one embodiment, network satellites 110A, 110B in a first orbital plane are communicatively linked with network satellites 110D, 110E, 110F in a second orbital plane. In another embodiment, network satellites 110A, 110B in a first orbital plane operate independently from network satellites 110D, 110E, 110F in a second orbital plane. In some embodiments, the communication between network satellites in different orbital planes is limited to when network satellites 110 are at or near the intersection line of the orbital planes, while in other embodiments, the communication between network satellites 110 is constant. In some embodiments, bridge satellites (not shown) are placed into orbit to enable or improve communication between the network satellites 110 of different populated orbital planes. In a preferred embodiment, the bridge satellites occupy orbital planes that are phase-shifted from the populated orbital planes, though in other embodiments, the bridge satellite orbital plane may be a different orbital radius or orbit at a different angle relative to the populated network satellite orbital planes.

In one embodiment, the storage satellites orbit a planet 1 in a low planetary orbit. In a specific embodiment, 6 network satellites 110 orbit the planet 1 at a distance of approximately 500 miles (roughly 800 km) above the surface of the planet. This radius may be entirely inside of the inner Van Allen radiation belt, and be therefore shielded from most solar radiation. At this orbit, 6 network satellites 110 may be capable of forming a continuous communication loop or satellite cloud network 100 around the planet 1. Additional network satellites 110 may be added and incorporated after the initial continuous cloud network 100 is created to improve capabilities, throughput, and redundancy. In some versions of this embodiment around a planet with a larger radius, the 6 network satellites would be dispersed unevenly across the orbital plane to form a cloud network 100 even though the network satellites 110 do not form a complete communicative loop and some potential communicative links between adjacent network satellites 110 may be blocked by the curvature of the planet 1.

In another embodiment, 8 network satellites 110 orbit the Earth 1 at a distance of 500 miles (~800 km) above the surface of the Earth, with two redundant network satellites 110 in a low power or idle mode. The 8 network satellites 110 transmit data and instructions 10 to and retrieve data and instructions 10 from geosynchronous communications satellites 120, and the geosynchronous communications satellites 120 in turn transmit data and instructions 10 to and retrieve data and instructions 10 from terrestrial access terminals 130 on the surface of the Earth 1. Other embodiments comprise a greater or lesser number of network satellites 110, which may include more or fewer active satellites and/or more or fewer redundant back-up satellites.

In further embodiments, it may be preferable to choose any other orbital radius between the surface of the earth and the inner bound of the inner Van Allen radiation belt. In still another embodiment, it may be preferable to orbit at an orbital radius between the outer bounds of the inner Van Allen belt and the inner bounds of the outer Van Allen radiation belt. Data storage may be corrupted by radiation, and especially electron radiation, so either of the previous embodiments take advantage of the relatively low radiation regions outside of the Van Allen belts. Despite the above stated preferable orbital radii, in some embodiments, it may be preferable or unavoidable to place some or all network satellites 110 at an orbital radius that remains inside of or passes through the Van Allen belts or other high radiation regions of space. Embodiments of the network satellites 110 that occupy or travel through the Van Allen belt may require additional shielding or may incorporate data storage elements 203 configured to function properly in the higher radiation regions of space. One embodiment of such a radiation-resistant data storage element 203 may incorporate additional redundant processes.

Still another embodiment includes a continuous loop of network satellites 110 in geosynchronous orbit. As few as 3 geostationary network satellites 110 orbiting about the Earth's equator could form a continuous communications network 100, though more satellites 110 may provide superior stability, accessibility, and throughput.

In one embodiment, the satellite cloud network 100 comprises a number of network satellites 110 travelling in a low-earth orbit (between 160 kilometers and 2000 kilometers above the surface of the earth).

While the above implementations and aspects primarily discuss incorporating data storage elements 203 into low-earth orbiting network satellites 110 and allowing access terminals 130 to communicate with the low-earth orbiting network satellites 110 through geostationary communications satellites 120, it is to be understood that a network 100 incorporating a different configuration of satellites and storage elements 203 could be configured without departing from the present application. Although some embodiments or aspects refers to geostationary or geosynchronous communications satellites or low earth orbit network satellites or storage satellites, it should be understood that those embodiments or aspects could incorporate satellites in alternate orbits (e.g., low earth orbit, middle earth orbit, inclined orbit, parallel orbits, elliptical orbits. Additionally, as shown in FIG. 3, in place of the communications satellites, the network satellites, or the access terminals, some embodiments could incorporate sub-orbital elements (150A, 150B) such as antennae, aircraft, airborne, automobiles, balloons, blimps, dirigibles, drones, gliders, jets, kites, mobile devices, planetary stations, rigid airships, ships, space stations, spacecraft, stationary data centers, mesh network devices, or watercraft. These sub-orbital elements 150 could function similarly to the satellite (110 or 120) or access terminal (130) equivalents, with adjustments to account for atmospheric operation, such as including elements to provide navigation, propulsion, or buoyancy. The sub-orbital elements 150 may communicate via radio frequency or laser link similar to the inter-satellite links used by satellites, and the sub-orbital element may communicate directly with access terminals 130, communications satellites 120, or network satellites 110. Another embodiment incorporates data storage elements 203 directly into geostationary communications satellites 120, enabling a terrestrial user to directly access the data storage satellites without any intermediaries. Such a configuration may require additional shielding surrounding the data storage element 203, due to the intense Van Allen radiation belt at earth's geosynchronous orbital radius; however, the same concern would not be true for all planets or celestial bodies. For example, a lunar-synchronous orbital satellite orbiting the moon would not pass through such severe radiation belts and would not require additional shielding (beyond the shielding required for reliable performance outside of the radiation shielding effect that the Van Allen belts provide for objects close to the Earth). Such a satellite cloud network 100 could be configured to work in many configurations and with additional satellites without departing from the spirit of the present invention. Such a satellite cloud network 100 would provide similar benefit whether the access terminal 130 communicates directly with the network satellites 110 configured for data storage or communicates through intermediate communications satellites 120. In various embodiments, the satellite cloud network 100 could be configured to include more or fewer satellites, a greater or lesser orbital radius, more or fewer orbital planes, different types of satellites, multiple independent networks, alternative communication systems, additional sensors, or security measures.

The foregoing description has described embodiments with orbital satellites and combinations thereof. It should be understood that orbital satellites are only one exemplary system for incorporation within the cloud network 100. Accordingly, the concepts of this disclosure can include other elements for data storage or communication relay, for example, antennae, aircraft, airborne, automobiles, balloons, blimps, dirigibles, drones, gliders, jets, kites, mobile devices, planetary stations, rigid airships, ships, space stations, spacecraft, stationary data centers, or watercraft. In one implementation, a single cloud network 100 may incorporate multiple different elements within the network 100. In such an implementation, the network 100 may incorporate a combination of network satellites, rigid airships, and drones. In a further embodiment, a satellite cloud network 100 could communicate with a floating or submerged data center in the ocean.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A space-based electronic data storage and transfer network system for relaying a data file from a ground-based access terminal through an orbital communications satellite for storage in a constellation of storage satellites comprising:
   at least one communication satellite comprising:
      a first power system comprising a first power source and a first power storage component capable of storing power received from the first power source;
      a first communications array powered by the first power system and configured to receive a data file from the ground-based access terminal, the first communications array being further configured to establish an optical inter-satellite link with at least one storage satellite and to relay the data file to the at least one storage satellite; and
      a processor powered by the first power system and coupled to the first and second communications arrays; and
   a plurality of storage satellites, each storage satellite comprising:
      a second power system comprising a second power source and a second power storage component capable of storing power received from the second power source;
      a second communications array powered by the second power system and configured to establish the optical inter-satellite link with the first communications array of the communication satellite, the second communications array being further configured to establish an optical inter-satellite link with the second communications array of other storage satellites, the third communications array being configured to receive the data file;
      at least one data storage element powered by the second power system;
      a processor powered by the second power system and coupled to the third communications array and the at least one data storage element, the processor configured to record the data file to the at least one data storage element and to retrieve the data file from the at least one data storage element in response to a data file retrieval request received by the third communication array;
   wherein each storage satellite is configured so that the communications satellite is capable of retrieving any data file stored on any second storage satellite through the optical inter-satellite link established with any first storage satellite; and
   wherein the at least one communications satellite occupies a geostationary orbit above the Earth's surface and the plurality of storage satellites are configured to occupy a low earth orbit less than 2,000 kilometers above the Earth's surface.

2. The space-based electronic data storage and transfer network system of claim 1, wherein each storage satellite is configured so that a data file can only be transmitted from an access terminal to a storage satellite is indirectly via a communications satellite.

3. The space-based electronic data storage and transfer network system of claim 1, wherein the plurality of storage satellites are configured to occupy a low earth orbit of approximately 700-900 kilometers above the earth's surface.

4. The space-based electronic data storage and transfer network system of claim 1, wherein the communications satellite is configured to receive and relay the data file from a ground-based access terminal to at least one of the storage satellites.

5. A space-based electronic data storage and transfer network system comprising:
   a storage constellation including a plurality of orbiting storage satellites configured to receive a data file from a communications satellite and record the data file to a data storage element;
   wherein the storage satellites are configured to be interconnected via optical inter-satellite link;
   wherein all storage satellites in the storage constellation are communicatively coupled to each other through a continuous loop of relays between consecutive storage satellites;
   wherein the storage constellation is configured to break the data file into a plurality of file fragments and each of the file fragments is redundantly recorded to at least two storage satellites;
   wherein each storage satellite is configured so that the only communication link for transmitting a data file from an access terminal to a storage satellite is indirectly through a communications satellite; and
   wherein the plurality of storage satellites are split into at least two orbital planes and each data file is redundantly stored in a storage satellite on at least two different orbital planes.

6. The space-based electronic data storage and transfer network system of claim 5, wherein each storage satellite is configured so that any first storage satellite can retrieve any data file stored on any second storage satellite in the storage constellation.

7. The space-based electronic data storage and transfer network system of claim 5, wherein the storage network is configured to retransmit the data file to be redundantly recorded on at least two storage satellites.

8. The space-based electronic data storage and transfer network system of claim 7, wherein a storage satellite receiving a data file retrieval request is configured to retrieve the data file or portions of the data file simultaneously from at least two storage satellites.

9. The space-based electronic data storage and transfer network system of claim 5, wherein each storage satellite is configured to maintain an open optical inter-satellite link with at least two other storage satellites.

10. The space-based electronic data storage and transfer network system of claim 5, wherein a second storage satellite is configured to relay transmit the data file from a first storage satellite where the data file is stored to a third storage satellite where a data file retrieval request was received.

11. The space-based electronic data storage and transfer network system of claim 5, wherein each storage satellite comprises:
a power system comprising a power source and a power storage component capable of storing power received from the power source;
a communications array powered by the power system and configured to establish the optical inter-satellite link with the other storage satellites in the storage constellation, the communications array being additionally configured to communicate with the communications satellite;
a data storage element powered by the power system; and
a processor powered by the power system and coupled to the communications array and the data storage element, the processor being configured to process the recordation of files to and retrieval of files from the data storage element, the processor being further configured to process the signals received from or sent to the communication array.

12. The space-based electronic data storage and transfer network system of claim 11, wherein the data storage element is surrounded by a radiation shielding element.

13. The space-based electronic data storage and transfer network system of claim 5, wherein the files are de-duplicated prior to being recorded to the data storage element.

14. A method for recording a data file on a space-based electronic data storage and transfer network system, the method comprising the steps of:
receiving a data file;
transmitting the data file from a first ground-based access terminal to a first communications satellite;
identifying a first storage satellite in a storage constellation available for optical inter-satellite link with the communications satellite;
transmitting the data file via an optical inter-satellite link from the communications satellite to the first storage satellite;
recording a first copy of the data file to a data storage element in the first storage satellite;
identifying a second storage satellite in the storage constellation available for storing a second copy of the data file;
transmitting the second copy of the data file via an optical inter-satellite link to a second storage satellite in the storage constellation;
recording the second copy of the data file to the data storage element in the second storage satellite;
receiving a retrieval request associated with the data file;
transmitting the retrieval request from a second ground-based access terminal to a second communications satellite;
identifying a third storage satellite in the storage constellation available for optical inter-satellite link with the second communications satellite;
transmitting the retrieval request via an optical inter-satellite link from the second communications satellite to the third storage satellite;
locating the first copy of the data file in the first data storage element of the first storage satellite;
locating the second copy of the data file in the second data storage element of the second storage satellite;
transmitting the retrieval request via an optical inter-satellite link to the first storage satellite in the storage constellation;
transmitting the retrieval request via an optical inter-satellite link to the second storage satellite in the storage constellation;
transmitting the first copy of the data file from the first data storage element in the first storage satellite to the third storage satellite;
transmitting the second copy of the data file to the data storage element in the second storage satellite to the third storage satellite;
transmitting the data file from the third storage satellite to the second communications satellite; and
transmitting the data file from the second communications satellite to the second around-based access terminal.

* * * * *